United States Patent
K et al.

(10) Patent No.: US 11,956,203 B2
(45) Date of Patent: Apr. 9, 2024

(54) SERVICE HANDLING IN SOFTWARE DEFINED NETWORKING BASED CONTAINER ORCHESTRATION SYSTEMS

(71) Applicant: TELEFONAKTIEBOLAGET LM ERICSSON (PUBL), Stockholm (SE)

(72) Inventors: Faseela K, Karnataka (IN); Vyshakh Krishnan C H, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 145 days.

(21) Appl. No.: 17/601,363

(22) PCT Filed: Apr. 4, 2019

(86) PCT No.: PCT/IN2019/050278
§ 371 (c)(1),
(2) Date: Oct. 4, 2021

(87) PCT Pub. No.: WO2020/202169
PCT Pub. Date: Oct. 8, 2020

(65) Prior Publication Data
US 2022/0191169 A1      Jun. 16, 2022

(51) Int. Cl.
*H04L 61/2521* (2022.01)
*G06F 9/455* (2018.01)
(Continued)

(52) U.S. Cl.
CPC ...... *H04L 61/2521* (2013.01); *G06F 9/45558* (2013.01); *H04L 47/125* (2013.01); *H04L 61/2514* (2013.01); *G06F 2009/45595* (2013.01)

(58) Field of Classification Search
CPC .............. H04L 61/2521; H04L 47/125; H04L 61/2514; H04L 45/0377; H04L 45/38;
(Continued)

(56) References Cited

U.S. PATENT DOCUMENTS 7,650,427 B1 * 1/2010 Liu ................... H04L 63/102
709/227
7,782,902 B2 * 8/2010 Deerman ............ H04L 61/2514
370/469

(Continued)

FOREIGN PATENT DOCUMENTS

CN          108141416 B  *  4/2020  ............. H04L 45/02
WO   WO-2017210824 A1 * 12/2017  ............. H04W 76/10
(Continued)

OTHER PUBLICATIONS

Opendaylight COE Service Implementation, "Netvirt COE Integration for Kubernetes Services with KubeProxy IpTables Mode", retrieved at https://docs.opendaylight.org/projects/netvirt/en/latest/specs/neon/coe-service-integration.html on Jan. 13, 2019.

(Continued)

*Primary Examiner* — Emmanuel L Moise
*Assistant Examiner* — Berhanu Shitayewoldetadik

(57) ABSTRACT

A method by a software defined networking (SDN) controller to configure a switch to perform translation module bypass in a container orchestration system. The method includes receiving a translation rule for a flow from a load balancer, sending translation module bypass instructions to a switch in response to receiving the translation rule for the flow, where the translation module bypass instructions include instructions for the switch to stop sending packets belonging to the flow to the translation module and to apply a network address translation specified by the translation rule for the flow to the packets belonging to the flow, and send an indication to the load balancer that the packets belonging to the flow are to bypass the translation module to cause the load balancer to disable timeout processing for the flow in the translation module.

18 Claims, 11 Drawing Sheets

(51) Int. Cl.
  *G06F 15/16* (2006.01)
  *H04L 12/721* (2013.01)
  *H04L 15/16* (2006.01)
  *H04L 29/06* (2006.01)
  *H04L 29/08* (2006.01)
  *H04L 29/12* (2006.01)
  *H04L 47/125* (2022.01)
  *H04L 61/2514* (2022.01)

(58) Field of Classification Search
  CPC ... H04L 45/42; H04L 45/655; H04L 67/1023; H04L 69/28; G06F 9/45558; G06F 2009/45595; G06F 2009/4557
  USPC .......................................................... 709/245
  See application file for complete search history.

(56) References Cited

U.S. PATENT DOCUMENTS

| | | | | |
|---|---|---|---|---|
| 8,289,968 | B1* | 10/2012 | Zhuang | H04L 61/2532 370/252 |
| 9,178,846 | B1* | 11/2015 | Kamisetty | H04L 63/02 |
| 10,057,109 | B2* | 8/2018 | Shatzkamer | H04L 41/5054 |
| 10,225,335 | B2 | 3/2019 | Fu et al. | |
| 11,106,785 | B2* | 8/2021 | Antony | H04L 63/0209 |
| 11,316,824 | B1* | 4/2022 | Suri | H04L 67/1095 |
| 2003/0159013 | A1* | 8/2003 | Frank | G06F 13/1615 711/154 |
| 2006/0274749 | A1* | 12/2006 | Beier | H04L 61/5014 709/245 |
| 2010/0251335 | A1* | 9/2010 | Srisuresh | H04L 12/66 726/13 |
| 2013/0201989 | A1* | 8/2013 | Hu | H04L 45/72 370/392 |
| 2015/0215819 | A1* | 7/2015 | Bosch | H04L 45/38 370/236 |
| 2016/0098344 | A1* | 4/2016 | Gorobets | G06F 3/0679 711/154 |
| 2016/0301632 | A1* | 10/2016 | Anand | H04L 47/125 |
| 2016/0308981 | A1* | 10/2016 | Cortes Gomez | H04L 41/0826 |
| 2017/0063927 | A1* | 3/2017 | Schultz | H04L 63/10 |
| 2017/0126790 | A1* | 5/2017 | Mortsolf | H04L 67/101 |
| 2017/0126792 | A1* | 5/2017 | Halpern | H04L 67/1001 |
| 2018/0063231 | A1* | 3/2018 | Park | G06F 9/45558 |
| 2018/0063233 | A1* | 3/2018 | Park | H04L 49/70 |
| 2018/0139272 | A1* | 5/2018 | Puri | G06F 9/5088 |
| 2018/0176124 | A1* | 6/2018 | Kancherla | H04L 61/2521 |
| 2018/0198854 | A1* | 7/2018 | Rong | H04L 45/72 |
| 2018/0300766 | A1* | 10/2018 | Ashner | H04L 47/125 |
| 2018/0359218 | A1* | 12/2018 | Church | H04L 43/062 |
| 2019/0045374 | A1* | 2/2019 | Loomba | H04W 28/0226 |
| 2020/0112487 | A1* | 4/2020 | Inamdar | H04L 67/56 |
| 2020/0125721 | A1* | 4/2020 | Antony | H04L 63/0209 |
| 2020/0177629 | A1* | 6/2020 | Hooda | H04L 63/1425 |
| 2020/0204489 | A1* | 6/2020 | Pianigiani | H04L 41/12 |
| 2020/0278892 | A1* | 9/2020 | Nainar | H04L 67/10 |
| 2020/0314015 | A1* | 10/2020 | Mariappan | H04L 41/0895 |
| 2020/0314694 | A1* | 10/2020 | Yu | H04L 45/74 |

FOREIGN PATENT DOCUMENTS

| | | | | |
|---|---|---|---|---|
| WO | WO-2018037266 A1 * | 3/2018 | ......... | H04L 12/4633 |
| WO | WO-2018118465 A1 * | 6/2018 | ............ | G06F 21/50 |
| WO | 2018220638 A1 | 12/2018 | | |
| WO | WO-2018220638 A1 * | 12/2018 | .......... | H04L 43/026 |

OTHER PUBLICATIONS

OpenShift SDN Documentation, "Additional Concepts | Architecture | OpenShift Enterprise 3.1", retrieved at https://docs.openshift.com/enterprise/3.1/architecture/additional_concepts/sdn.htm on Jan. 13, 2019.

* cited by examiner

SERVICE HANDLING IN SOFTWARE DEFINED NETWORKING BASED CONTAINER ORCHESTRATION SYSTEMS

TECHNICAL FIELD

Embodiments of the invention relate to the field of computer networks, and more specifically to providing efficient service handling in software defined networking based container orchestration systems.

BACKGROUND ART

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure. OpenFlow is an example of a southbound communications protocol that enables controllers and switches in an SDN network to communicate with each other.

Kubernetes is an open-source container orchestration system for automating application deployment, scaling, and management in a cluster. Kubernetes components can be divided into those that are part of the control plane and those that manage an individual node. The Kubernetes master is the main controlling unit of the cluster that makes global decisions about the cluster (e.g., scheduling decisions) and detects and responds to cluster events. The Kubernetes node, also known as a worker or minion, is a machine (e.g., virtual machine (VM) or physical machine) on which containers (workloads) can be deployed. The basic scheduling unit in Kubernetes is a pod. A pod includes one or more containers that are guaranteed to be co-located on the same host machine and can share resources. Pods provide a higher level of abstraction by grouping containerized components.

A Kubernetes service (sometimes called a micro-service) is an abstraction which defines a logical set of pods and a policy by which to access them. The set of pods targeted by a service is usually determined by a label selector. As an example, consider an image-processing backend which is running with three replicas. Those replicas are fungible—frontends do not care which backend they use. While the actual pods that compose the backend set may change, the frontend clients should not need to be aware of that or keep track of the list of backends themselves. The service abstraction enables this decoupling.

Each node in Kubernetes runs a kube-proxy. The kube-proxy is an implementation of a network proxy and a load balancer that is configured to send traffic to and from the appropriate containers. The kube-proxy may run in an iptables proxy mode. In this mode the kube-proxy watches the Kubernetes master for the addition and removal of service and endpoint objects. For each service, it installs iptables rules which capture traffic to the service's cluster Internet Protocol (IP) address and port and redirects that traffic to one of the service's backend sets. For each endpoints object, it installs iptables rules which select a backend pod.

Many of the SDN-based networking solutions for Kubernetes services use the iptables proxy mode. These solutions may employ a virtual switch (e.g., Open vSwitch) in the data plane to provide connectivity to pods, where the virtual switch redirects every packet to iptables for services lookup. Redirecting every packet to iptables is not a scalable solution as it increases the data plane latency. While there exist solutions that attempt to reduce the latency of the iptables proxy mode (e.g., Internet Protocol Virtual Server (IPVS) mode), iptables-based solutions have several benefits such as providing flexibility to manipulate packages at different stages (e.g., pre-routing, post-routing, forward, input, and output) and providing more types of operations (e.g., source network address translation (SNAT), destination network address translation (DNAT), reject packets, and port translations).

SUMMARY

A method by one or more network devices implementing a software defined networking (SDN) controller to configure a switch communicatively coupled to the controller to perform translation module bypass in a container orchestration system, where the controller is communicatively coupled to a load balancer of the container orchestration system, where the load balancer is configured to generate translation rules for flows to be installed in a translation module of the container orchestration system that specify network address translations to be applied to packets belonging to the flows to cause the packets to be sent to or from one or more processing units of the container orchestration system, and where the one or more processing units form a service and each of the one or more processing units includes one or more containers. The method includes receiving, from the load balancer, a translation rule for a flow, where the translation rule for the flow specifies one or more attributes that identify the flow and a network address translation to apply to packets belonging to the flow, sending, to the switch, translation module bypass instructions for the flow in response to receiving the translation rule for the flow, where the translation module bypass instructions for the flow include instructions for the switch to stop sending the packets belonging to the flow to the translation module and to apply the network address translation specified by the translation rule for the flow to the packets belonging to the flow, and sending an indication to the load balancer that the packets belonging to the flow are to bypass the translation module to cause the load balancer to disable timeout processing for the flow in the translation module.

A network device configured to implement a software defined networking (SDN) controller to configure a switch communicatively coupled to the controller to perform translation module bypass in a container orchestration system, where the controller is to be communicatively coupled to a load balancer of the container orchestration system, where the load balancer is configured to generate translation rules for flows to be installed in a translation module of the container orchestration system that specify network address translations to be applied to packets belonging to the flows to cause the packets to be sent to or from one or more processing units of the container orchestration system, and where the one or more processing units form a service and each of the one or more processing units includes one or more containers. The network device includes a set of one or more processors and a non-transitory computer-readable storage medium to store instructions, which when executed by the set of one or more processors, causes the network device to receive, from the load balancer, a translation rule for a flow, where the translation rule for the flow specifies one or more attributes that identify the flow and a network address translation to apply to packets belonging to the flow, send, to the switch, translation module bypass instructions for the flow in response to receiving the translation rule for the flow, where the translation module bypass instructions for the flow include instructions for the switch to stop sending the packets belonging to the flow to the translation module and to apply the network address translation specified by the translation rule for the flow to the packets belonging to the flow, and send an indication to the load balancer that the packets belonging to the flow are to bypass the translation module to cause the load balancer to disable timeout processing for the flow in the translation module.

A non-transitory computer-readable storage medium storing instructions, which when executed by one or more processors of a network device implementing a software defined networking (SDN) controller communicatively coupled to a switch, causes the network device to perform operations for configuring the switch to perform translation module bypass in a container orchestration system, where the controller is to communicatively coupled to a load balancer of the container orchestration system, where the load balancer is configured to generate translation rules for flows to be installed in a translation module of the container orchestration system that specify network address translations to be applied to packets belonging to the flows to cause the packets to be sent to or from one or more processing units of the container orchestration system, and where the one or more processing units form a service and each of the one or more processing units includes one or more containers. The operations include receiving, from the load balancer, a translation rule for a flow, where the translation rule for the flow specifies one or more attributes that identify the flow and a network address translation to apply to packets belonging to the flow, sending, to the switch, translation module bypass instructions for the flow in response to receiving the translation rule for the flow, where the translation module bypass instructions for the flow include instructions for the switch to stop sending the packets belonging to the flow to the translation module and to apply the network address translation specified by the translation rule for the flow to the packets belonging to the flow, and sending an indication to the load balancer that the packets belonging to the flow are to bypass the translation module to cause the load balancer to disable timeout processing for the flow in the translation module.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
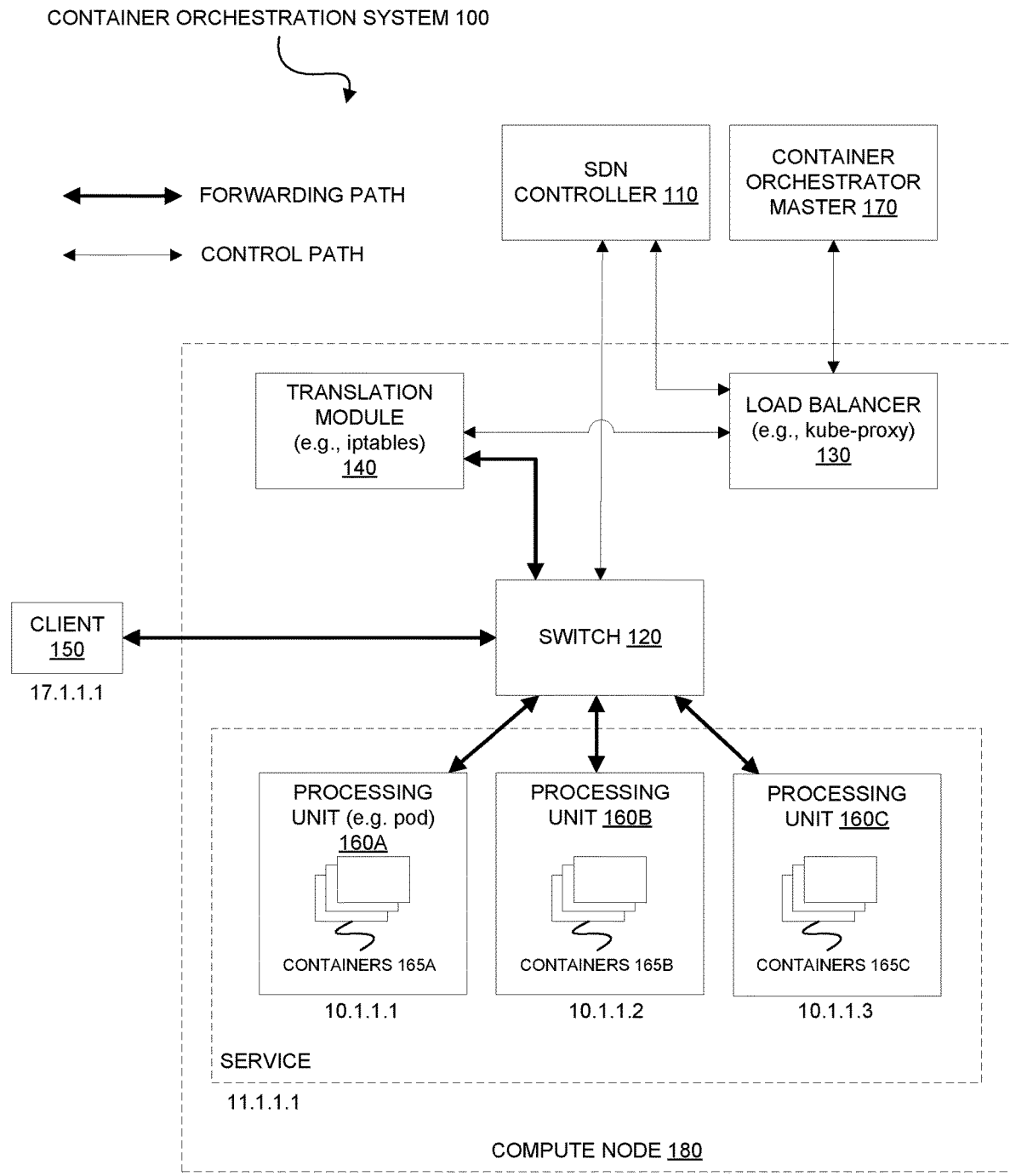
FIG. 1 is a block diagram illustrating a container orchestration system in which translation module bypass can be implemented, according to some embodiments.

The following description describes methods and apparatus for providing efficient service handling in software defined networking (SDN) based container orchestration systems. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, many of the SDN-based networking solutions for Kubernetes services use the iptables proxy mode. These solutions may employ a virtual switch (e.g., Open vSwitch) in the data plane to provide connectivity to pods, where the virtual switch redirects every packet to iptables for services lookup. Redirecting every packet to iptables is not a scalable solution as it increases the data plane latency.

Embodiments described herein reduce the data plane latency by allowing packets belonging to flows to bypass a translation module (e.g., iptables) of a container orchestration system (e.g., Kubernetes). According to some embodiments, an SDN controller is communicatively coupled to a load balancer (e.g., kube-proxy) of the container orchestration system that is configured to generate translation rules for flows to be installed in the translation module of the container orchestration system. The translation rules specify network address translations to be applied to packets belonging to the flows to cause the packets to be sent to or from processing units (e.g., pods) of the container orchestration system forming a service. According to some embodiments, the SDN controller may receive, from the load balancer, a translation rule for a flow, where the translation rule for the flow specifies one or more attributes that identify the flow and a network address translation to apply to packets belonging to the flow. In response to receiving the translation rule for the flow from the load balancer, the SDN controller sends, to a switch (e.g., Open vSwitch), translation module bypass instructions for the flow, where the translation module bypass instructions for the flow include instructions for the switch to stop sending the packets belonging to the flow to the translation module and to apply the network address translation specified by the translation rule for the flow to the packets belonging to the flow. The SDN controller may then send an indication to the load balancer that the packets belonging to the flow are to bypass the translation module to cause the load balancer to disable timeout processing for the flow in the translation module so that the translation module does not prematurely remove the translation rule for the flow. Various embodiments are further described herein.

FIG. 1 is a block diagram illustrating a container orchestration system in which translation module bypass can be implemented, according to some embodiments. As shown in the diagram, the container orchestration system 100 includes a compute node 180, an SDN controller 110 (sometimes simply referred to as "controller"), a container orchestrator master 170, and a client 150. As shown in the diagram, the compute node 180 includes a translation module 140, a load balancer 130, a virtual switch 120 (sometimes simply referred to as "switch"), and processing units 160A-C. The compute node 180 may be a physical machine or a virtual machine (VM) on which processing units 160 can be deployed. Each of the processing units 160 includes one or more containers 165 (e.g., Docker® containers) implementing an application. For example, as shown in the diagram, processing unit 160A includes containers 165A, processing unit 160B includes containers 165B, and processing unit 160C includes containers 165C. Each of the processing units 160A-C may provide the same functionality/application (e.g., some type of back-end functionality/application) and may collectively form a service (also commonly referred to a "micro-service") (e.g., a Kubernetes service). In this example, the processing units 160A-C form a service that is reachable using IP address 11.1.1.1. Each of processing units 160A-C forming the service may be assigned a unique network address. For example, as shown in the diagram, processing unit 160A is assigned Internet Protocol (IP) address 10.1.1.1, processing unit 160B is assigned IP address 10.1.1.2, and processing unit 160C is assigned IP address 10.1.1.3. The client 150 may access the service formed by processing units 160A-C using the network address of the service (e.g., IP address 11.1.1.1). In this example, the client 150 is assigned IP address 17.1.1.1. While the diagram shows three processing units 160A-C deployed on the compute node 180, it should be understood that more or less processing units 160 may be deployed on the compute node 180 than shown in the diagram. Also, while the diagram shows three processing units 160A-C forming a service, it should be understood that a service can be formed by more or less processing units 160 than shown in the diagram.

In one embodiment, the container orchestration system 100 is a Kubernetes system. In such an embodiment, the container orchestrator master 170 may be a Kubernetes master and the compute node 180 may be a Kubernetes node. Also, the translation module 140 may be iptables, the load balancer 130 may be a kube-proxy, and each of processing units 160A-C may be a Kubernetes pod. While various embodiments are primarily described herein in a context where the container orchestration system 100 is a Kubernetes system, it should be understood that the translation module bypass techniques described herein are applicable to other types of container orchestration systems 100.

The load balancer 130 enables load balancing of flows among the processing units 160 forming a service. For example, the load balancer 130 may determine how to load balance flows originating from different clients 150 among the different processing units 160 that form a service. As shown in the diagram, the load balancer 130 is communicatively coupled to the translation module 140. The load balancer 130 may generate translation rules for one or more flows that are to be installed in the translation module 140 to enable the load balancing. The load balancer 130 may install translation rules in the translation module 140 using a library developed for configuring the translation module 140.

The translation rule for a particular flow may specify one or more attributes that identify that particular flow and a network address translation to apply to packets belonging to that flow. The load balancer 130 may install the translation rules it generates in the translation module 140 so that the translation module 140 can apply the necessary network address translations to packets belonging to the one or more flows. Table I shows an exemplary bi-directional translation rule (including a translation rule for the flow going from processing unit 160A to the Internet (client 150 in this example) and a translation rule for the flow going from the Internet to processing unit 160A).

TABLE I

| Interface | Flow identification | Translate field | Field value |
| --- | --- | --- | --- |
| Interface-1 | Source-IP—10.1.1.1<br>Destination-IP—17.1.1.1<br>Protocol—TCP<br>Source-port—5123<br>Destination-port—80 | Source-IP | 11.1.1.1 |
| Internet | Source-IP—17.1.1.1<br>Destination-IP—11.1.1.1<br>Protocol—TCP<br>Source-port—80<br>Destination-port—5123 | Destination-IP | 10.1.1.1 |

As shown in Table I, each translation rule includes an interface field, a flow identification field, a translate field, and a field value field. The interface field is used to specify the interface on which the packet was received. The interface may indicate whether the flow is going from the inside to the Internet or from the Internet to inside. In one embodiment, a Virtual Local Area Network (VLAN) ID or a Virtual Private Network (VPN) ID is used instead of an interface (e.g., to distinguish between multiple cloud tenants in a cloud environment). The flow identification field is used to specify the attributes of the flow. In one embodiment, the attributes of the flow include a five-tuple of source IP address, source port, destination IP address, destination port, and protocol (e.g., Transmission Control Protocol (TCP) or User Datagram Protocol (UDP)). The translate field is used to specify the field in the packet header that is to be translated. The field to be translated is typically the source IP address field (for source network address translation (SNAT)) or the destination IP address field (for destination network address translation (DNAT)). The field value field is used to specify the translated value. The translated value is typically an IP address.

The translation rule in the first row of Table I is a translation rule for the flow going from processing unit 160A to the client 150. The interface field of this translation rule specifies "Interface-1" which is the interface associated with traffic coming from the processing units 160. The flow identification field of this translation rule specifies a source IP address of 10.1.1.1 and a source port of 5123, which is the private IP address/port of processing unit 160A. The flow identification field further specifies a destination IP address of 17.1.1.1 and a destination port of 80, which is the public IP address/port of the client 150. The flow identification field further specifies TCP as the protocol. The translate field specifies the source IP address field as the field that is to be translated and the field value field specifies 11.1.1.1 as the translated value, which is the public IP address of the service formed by processing units 160A-C. Thus, the translation rule in the first row of Table I indicates that the source IP address of packets originating from processing unit 160A and destined for the client 150 is to be translated from 10.1.1.1 (the private IP address of processing unit 160A) to 11.1.1.1 (the public IP address of the service provided by the processing units 160).

The translation rule in the second row of Table I is a translation rule for the flow going from the client 150 to processing unit 160A. The interface field of this translation rule specifies "Internet" which is the interface associated with traffic coming from the Internet. The flow identification field of this translation rule specifies a source IP address of 17.1.1.1 and a source port of 80, which is the public IP address/port of the client 150. The flow identification field further specifies a destination IP address of 11.1.1.1 and a destination port of 5123, which is the public IP address/port of the service formed by processing units 160A-C. The flow identification field further specifies TCP as the protocol. The translate field specifies the destination IP address field as the field that is to be translated and the field value field specifies 10.1.1.1 as the translated value, which is the private IP address of processing unit 160A. Thus, the translation rule in the second row of Table I indicates that the destination IP address of packets originating from the client 150 and destined for the service formed by processing units 160A-C is to be translated from 11.1.1.1 (the public IP address of the service) to 10.1.1.1 (the private IP address of processing unit 160A).

The container orchestrator master 170 is a controlling unit of a cluster of compute nodes 180 that makes global decisions about the cluster (e.g., scheduling decisions) and detects and responds to cluster events. While the diagram shows a single compute node 180 being managed by the container orchestration master 170, it should be understood that the container orchestration master 170 can manage a cluster that includes multiple compute nodes 180 and that the translation module bypass mechanisms described herein can be applied to a multi-node cluster. As shown in the diagram, the container orchestrator master 170 is communicatively coupled to the load balancer 130. The container orchestrator master 170 may inform the load balancer 130 regarding the addition and/or removal of service objects and endpoint objects to allow the load balancer 130 to make load balancing decisions. The container orchestrator master 170 may communicate with the load balancer 130 using an application programming interface (API) of the container orchestration system 100.

The controller 110 is communicatively coupled to the switch 120 and may configure the forwarding behavior of the switch 120 over a southbound interface using a southbound communications protocol (e.g., OpenFlow). The switch 120 is also communicatively coupled to the client 150, the translation module 140, and the processing units 160A-C. The switch 120 provides the forwarding (data) plane for forwarding packets from the client 150 to the service formed by the processing units 160 and vice versa. In the diagram, the forwarding path is shown with bolded arrows and the control path is shown with plain (non-bolded) arrows. With existing solutions, whenever the switch 120 receives a packet from the client 150 that is destined for the service (e.g., the source IP address of the packet is 17.1.1.1 and the destination IP address of the packet is 11.1.1.1), the switch 120 sends the packet to the translation module 140 for translation. The translation module 140 translates the destination network address of the packet to the network address of one of the processing units 160 according to the translation rule for the flow (e.g., the translation rule in the second row of Table I) and sends the packet back to the switch 120. The switch 120 then sends the translated packet to the processing unit 160 (e.g., processing unit 160A). Also, in the reverse direction, whenever the switch 120 receives a packet from one of the processing units 160 that is destined for the client 150 (e.g., the source IP address of the packet is 10.1.1.1 and the destination IP address of the packet is 17.1.1.1), the switch 120 again sends the packet to the translation module 140 for translation. The translation module 140 translates the source network address of the packet to the network address of the service according to the translation rule for the flow (e.g., the translation rule in the first row of Table I) and sends the packet back to the switch 120. The switch 120 then sends the translated packet to the client 150. Thus, with existing solutions, every packet belonging to the flows (in the forward and reverse direction) needs to traverse the translation module 140. This increases the latency of the flows and consumes bandwidth. While for the sake of illustration the diagram shows a single client 150 accessing the service formed by processing units 160A-C, it should be understood that more than one client 150 may access the service, and that the traffic to and from different clients may be considered as different flows that are load balanced differently (e.g., sent to/from different ones of processing units 160A-C).

Embodiments overcome some of the disadvantages of existing solutions by allowing packets to bypass the translation module 140. Embodiment are based on the recognition that once the load balancer 130 has selected a processing unit 160 that is to process packets belonging to a flow (based on making a load balancing decision), all packets belonging to that flow are to be processed by the selected processing unit 160, and thus the translation rule for the flow is fixed. Accordingly, the load balancer 130 may send the translation rule for the flow to the controller 110 and the controller 110 may configure the switch 120 to apply the translation rule without having to send packets to the translation module 140. This allows for packets belonging to the flow to bypass the translation module 140 and thus such technique is generally referred to herein as "translation module bypass." Additional details regarding how translation module bypass is achieved is provided below.

As shown in the diagram, the load balancer 130 is communicatively coupled to the controller 110. In one embodiment, once the load balancer 130 generates a translation rule for a flow, it sends the translation rule to the controller 110. In one embodiment, the controller 110 may communicate with the load balancer 130 using a Representational State Transfer (REST) based interface. In response, the controller 110 may send translation module bypass instructions for the flow to the switch 120, where the translation module bypass instructions for the flow include instructions for the switch 120 to stop sending the packets belonging to the flow to the translation module 140 and to apply the network address translation specified by the translation rule for the flow to the packets belonging to the flow. This way, the switch 120 is configured to apply network address translation to packets belonging to the flow without having to send those packets to the translation module 140, thereby avoiding the latency associated with the switch 120 having to send packets to the translation module 140 and for the translation module 140 to send packets back to the switch 120.

In one embodiment, the translation module 140 maintains a timeout timer for each flow. The translation module 140 may reset the timeout timer for a flow each time a packet belonging to that flow is received. However, if the translation module 140 does not receive a packet belonging to that flow before the timeout timer for that flow expires, it is assumed that the flow has terminated and in such case the translation module 140 may remove the translation rule for that flow.

In one embodiment, the translation module 140 may determine that a flow has terminated based on a flag included in a packet belonging to the flow. For example, in TCP, the end of a session is indicated using a FIN flag included in a packet. As such, the translation module 140 may remove the translation rule for a flow based on the FIN flag included in a packet belonging to the flow (instead of relying on the flow timing out).

However, if the packets belonging to a flow bypasses the translation module, then the translation module 140 may erroneously determine that the flow has timed out and thus remove the translation rule for the flow even though the flow may still be alive. To avoid such timeouts from occurring, in one embodiment, once the controller 110 has configured the switch 120 to perform translation module bypass for a flow, the controller 110 sends an indication to the load balancer 130 that the flow is to bypass the translation module 140. In response to receiving such indication, the load balancer 130 may disable timeout processing for the flow in the translation module 140 so that the translation module 140 does not prematurely remove the translation rule for the flow. In one embodiment, when the controller 110 determines that the flow has terminated (e.g., this may be based on receiving an indication from the switch 120 that the flow has terminated), it may send an indication to the load balancer 130 that the flow has terminated. In response to receiving such indication, the load balancer 130 may remove the translation for the flow from the translation module 140.

According to some embodiments, translation module bypass can be selectively performed for specific flows such as elephant flows. Elephant flows are large flows with long durations (what is considered a large flow and a long duration can be defined by a network operator or other entity). In one embodiment, the controller 110 determines which flows are to bypass the translation module 140 (e.g., by only sending translation module bypass instructions for selected flows).

The translation module bypass mechanism described herein provide several advantages over existing solutions. One advantage is that latency is reduced for flows going to (and from) a service in the container orchestration system 100 since the packets belonging to the flows do not need to traverse the translation module 140. Another advantage is that the amount of bandwidth consumed to and from the translation module 140 is reduced. Yet another advantage is that in the cases where the translation module 140 is overloaded, the translation module bypass mechanism can be used to offload processing from the translation module 140 to the switch 120 without disruption.

Figure 2:
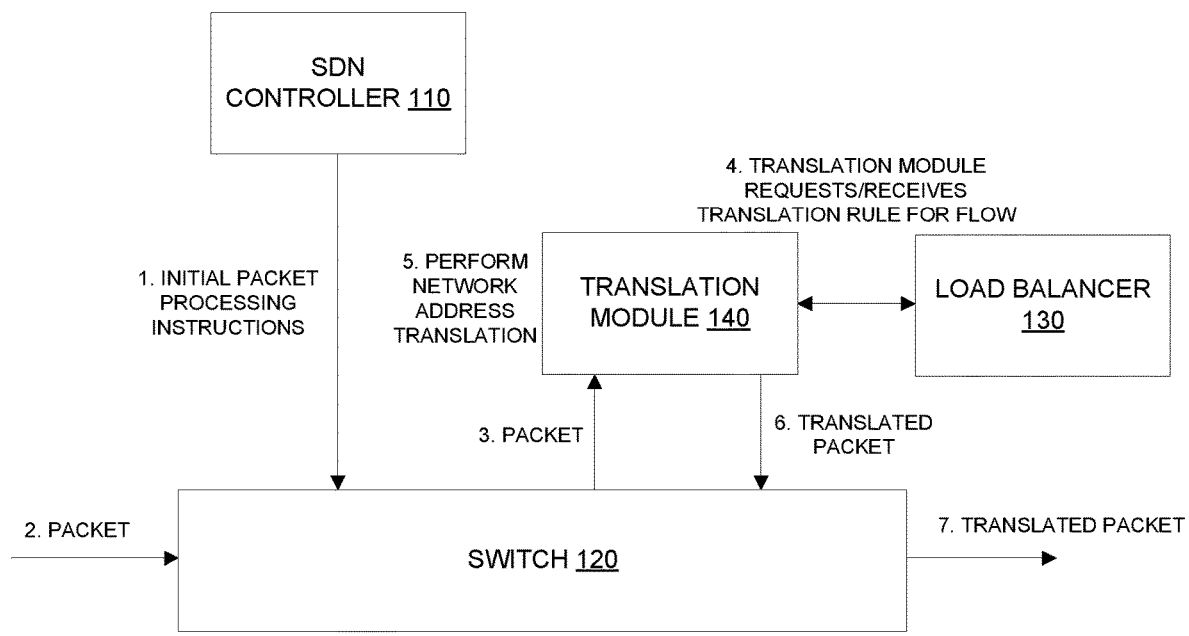
FIG. 2 is a block diagram illustrating operations in a container orchestration system before translation module bypass for a flow has been configured, according to some embodiments.

FIG. 2 is a block diagram illustrating operations in a container orchestration system for processing a packet belonging to a flow before translation module bypass for the flow has been configured, according to some embodiments. As shown in the diagram, at operation 1, the controller 110 sends initial packet processing instructions to the switch 120. These instructions may include instructions for the switch 120 to send packets belonging to the flow to the translation module 140 for translation. At operation 2, the switch 120 receives a packet belonging to the flow. At operation 3, the switch 120 sends the packet to the translation module 140 for translation (e.g., according to the initial packet processing instructions that it received from the controller 110). At operation 4, the translation module 140 sends a request to the load balancer 130 for a translation rule for the flow (e.g., because the translation module 140 currently does not have a translation rule for the flow) and receives a translation rule for the flow from the load balancer 130, where the translation rule for the flow specifies a network address translation to apply to packets belonging to the flow. At operation 5, the translation module 140 applies network address translation to the packet according to the translation rule for the flow (e.g., translates private IP address into public IP address or vice versa). At operation 6, the translation module 140 sends the translated packet to the switch 120. At operation 7, the switch 120 continues sending the translated packet towards its intended destination.

Figure 3:
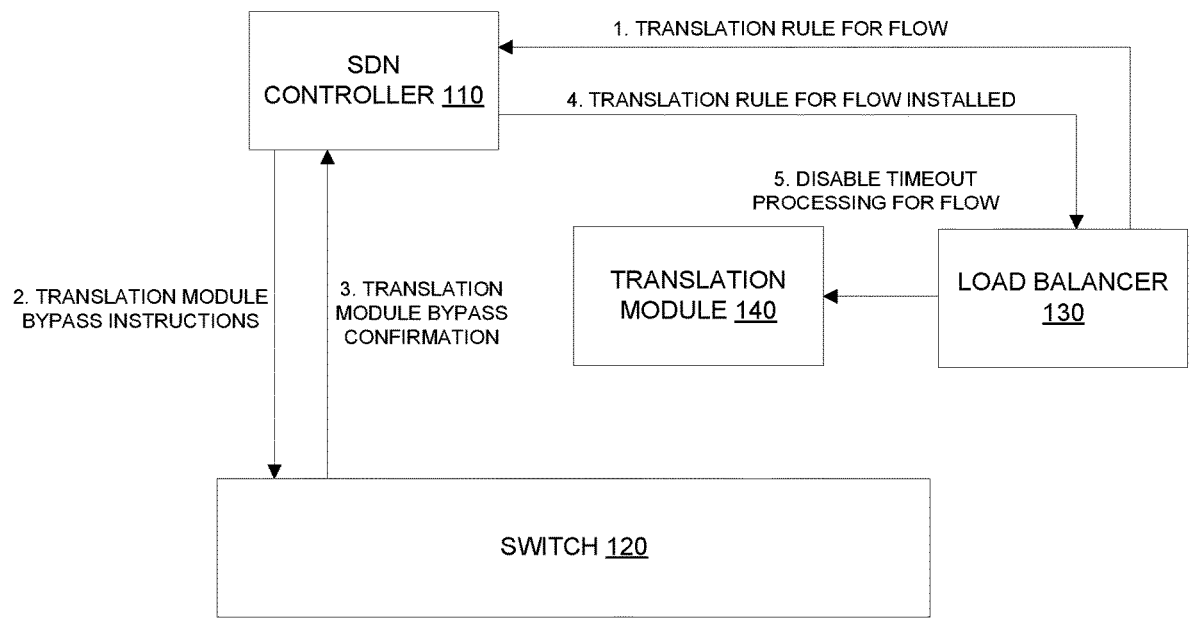
FIG. 3 is a block diagram illustrating operations in a container orchestration system for configuring translation module bypass for the flow, according to some embodiments.

FIG. 3 is a block diagram illustrating operations in a container orchestration system for configuring translation module bypass for the flow, according to some embodiments. At step 1, the load balancer 130 generates and sends a translation rule for the flow to the controller 110. At operation 2, the controller 110 sends translation module bypass instructions for the flow to the switch 120. The translation module bypass instructions may include instructions for the switch 120 to stop sending the packets belonging to the flow to the translation module 140 and to apply the network address translation specified by the translation rule for the flow to the packets belonging to the flow. At operation 3, if translation module bypass has been successfully configured in the switch 120, the switch 120 sends an indication to the SDN controller 110 that translation module bypass for the flow has been configured ("translation module bypass confirmation"). In response, at operation 4, the controller 110 transmits an indication to the load balancer 130 that the packets belonging to the flow are to bypass the translation module 140 ("translation rule for flow installed"). In response, at operation 5, the load balancer 130 disables timeout processing for the flow in the translation module 140 to prevent the flow from prematurely timing out.

Figure 4:
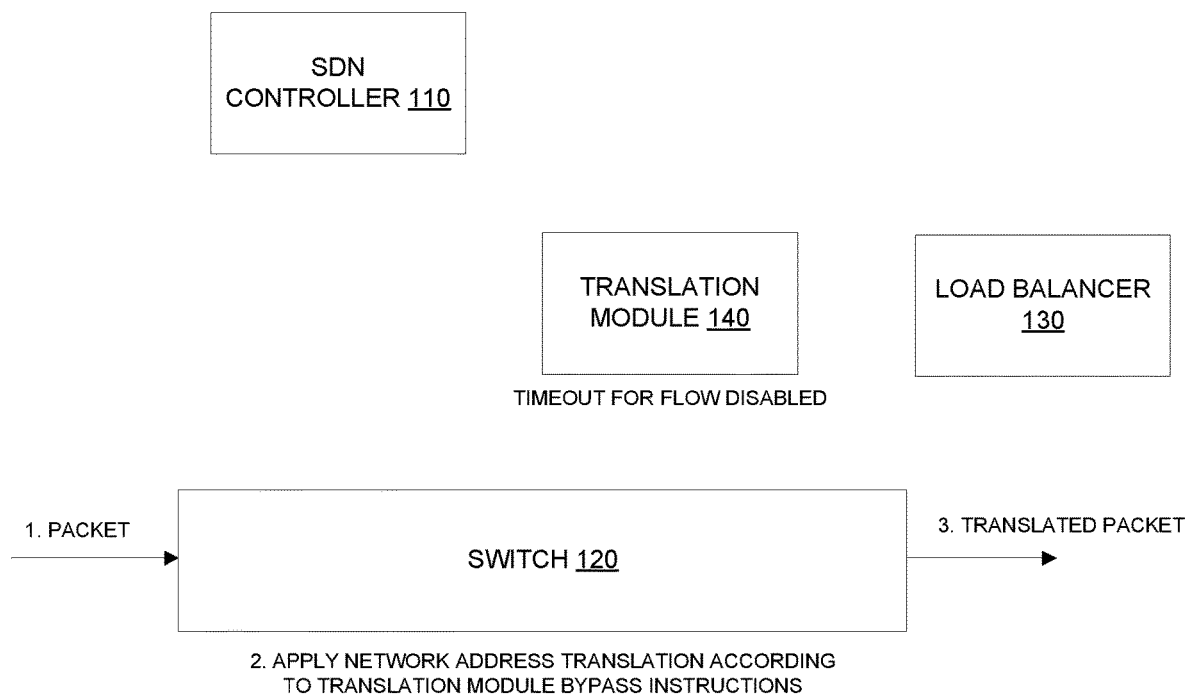
FIG. 4 is a block diagram illustrating operations in a container orchestration system after translation module bypass for the flow has been configured, according to some embodiments.

FIG. 4 is a block diagram illustrating operations in a container orchestration system for processing a packet after translation module bypass for the flow has been configured, according to some embodiments. At operation 1, the switch 120 receives a packet belonging to the flow. The switch 120 applies network address translation to the packet according to the translation module bypass instructions it previously received from the controller 110 (e.g., translates private IP address into public IP address or vice versa) and at operation 3, the switch 120 sends the translated packet towards its intended destination. It should be noted that the switch 120 itself applies the network address translation and thus there is no need for the switch 120 to send the packet to the translation module 140. As a result, latency and bandwidth consumption is reduced. Also, it should be noted that timeout processing for the flow has been disabled in the translation module 140 to prevent the flow from prematurely timing out (e.g., as a result of operation 5 of FIG. 3). This prevents the translation rule for the flow from being removed from the translation module 140 due to the flow timing out while the packets belonging to the flow bypass the translation module 140.

Figure 5:
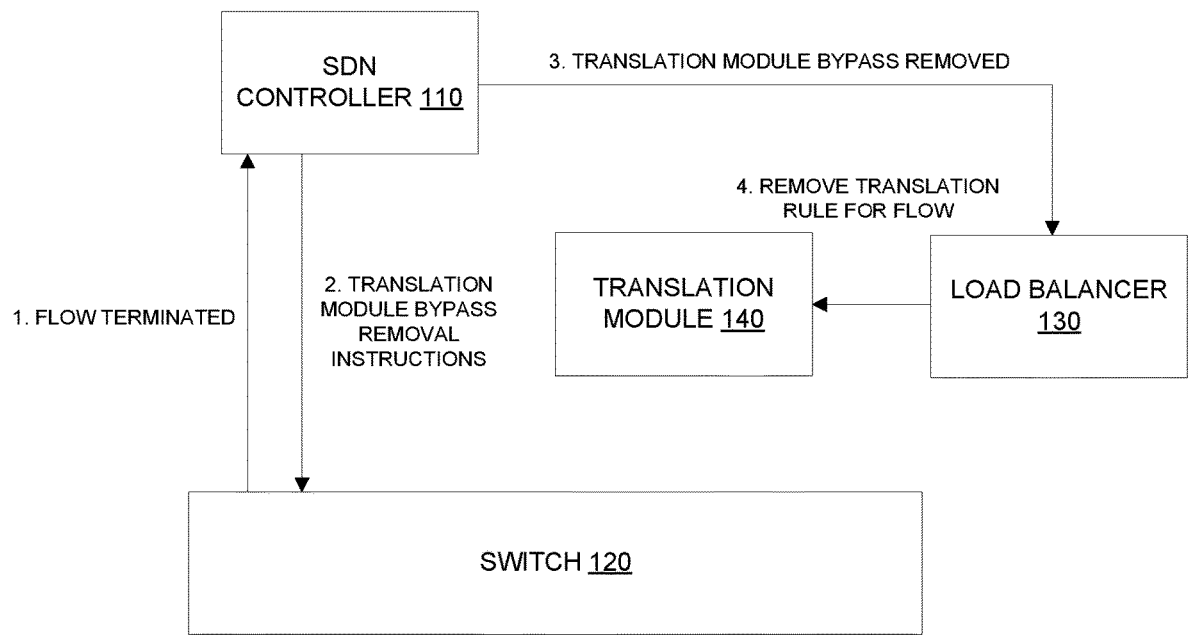
FIG. 5 is a block diagram illustrating operations in a container orchestration system for handling termination of the flow, according to some embodiments.

FIG. 5 is a block diagram illustrating operations in a container orchestration system for handling termination of the flow, according to some embodiments. At operation 1, the switch 120 sends an indication to the controller 110 that the flow has terminated ("flow terminated"). In one embodiment, the switch 120 may have determined that the flow has terminated based on seeing the FIN flag or other indication of session termination in a packet belonging to the flow. At operation 2, the controller 110 sends translation module bypass removal instructions to the switch 120. The translation module bypass removal instructions may include instructions for the switch 120 to stop applying the network address translation specified by the translation rule for the flow to the packets belonging to the flow. At operation 3, the controller 110 sends an indication to the load balancer 130 that translation module bypass for the flow has been removed ("translation module bypass removed"). In response, at operation 4, the load balancer 130 removes the translation rule for the flow from the translation module 140.

Figure 6:
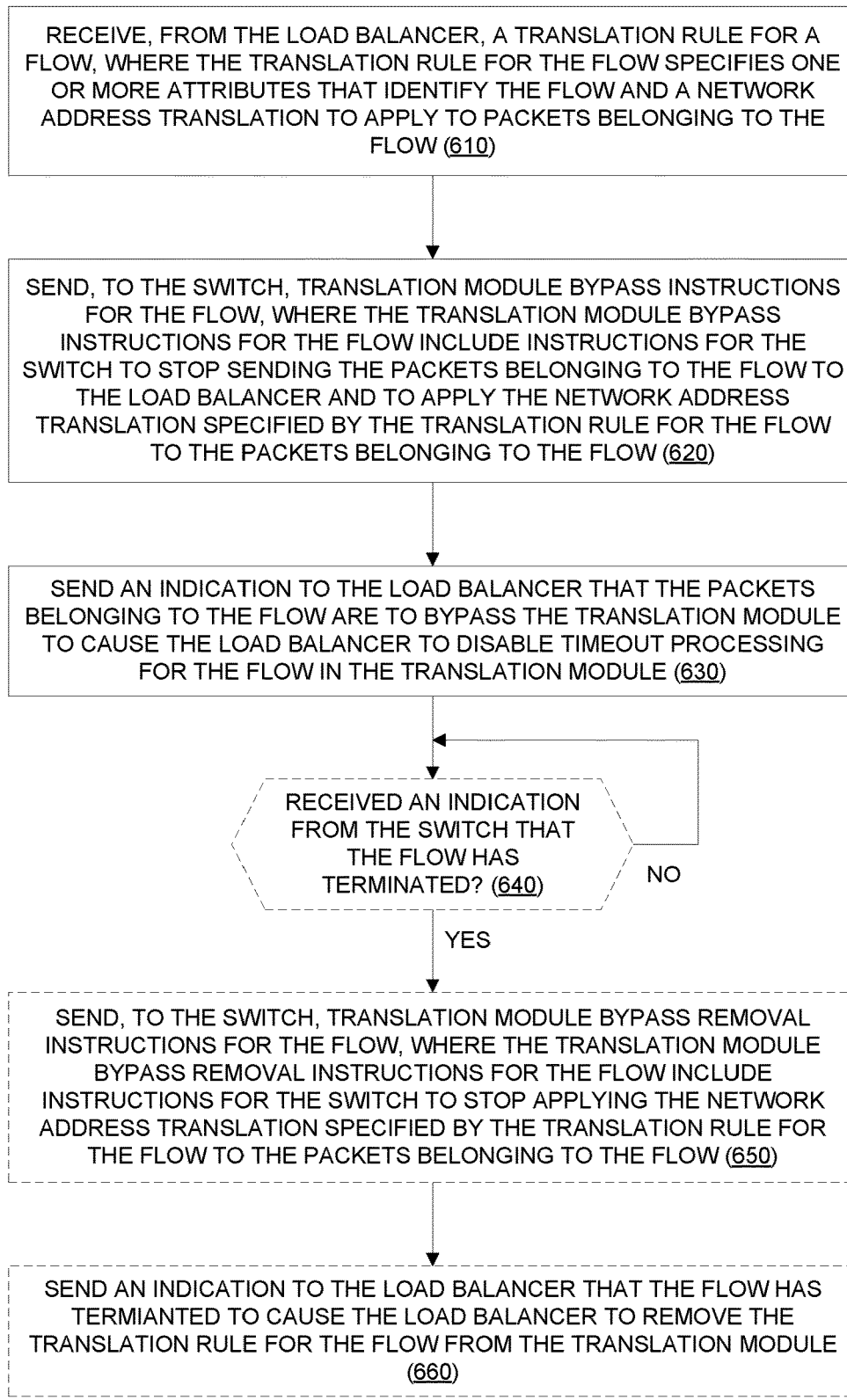
FIG. 6 is a flow diagram of a process for configuring a switch to perform translation module bypass for a flow, according to some embodiments.

FIG. 6 is a flow diagram of a process for configuring a switch to perform translation module bypass for a flow, according to some embodiments. In one embodiment, the process is performed by a controller 110 that manages the switch 120 and that is communicatively coupled to a load balancer 130 of a container orchestration system 100. In one embodiment, the controller 110 and the switch 120 communicate using a southbound communications protocol such as OpenFlow. In one embodiment, the load balancer 130 is communicatively coupled to a translation module 140 of the container orchestration system 100. In one embodiment, the container orchestration system 100 includes one or more processing units 160 forming a service, where each of the one or more processing units 160 includes one or more containers 165. In one embodiment, the container orchestration system 100 is a Kubernetes system, the translation module 140 is iptables, the load balancer 130 is a kube-proxy, and the one or more processing units 160 are one or more pods. In one embodiment, the translation module 140, the load balancer 130, the switch 120, and the one or more processing units 160 are implemented on the same compute node 180, where the compute node 180 is a virtual machine or a physical network device. The operations in this and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

In one embodiment, the process is initiated when the controller receives, from the load balancer, a translation rule for a flow, where the translation rule for the flow specifies one or more attributes that identify the flow and a network address translation to apply to packets belonging to the flow (block 610). In one embodiment, the one or more attributes that identify the flow includes a source network address, a source port, a destination network address, a destination port, and a protocol type. In one embodiment, the network address translation to apply to packets belonging to the flow includes a DNAT that translates a public network address of the service formed by the one or more processing units to a private network address of one of the one or more processing units. In one embodiment, the network address translation to apply to packets belonging to the flow includes an SNAT that translates a private network address of one of the one or more processing units to a public network address of a service formed by the one or more processing units.

In response to receiving the translation rule for the flow, the controller sends, to the switch, translation module bypass instructions for the flow, where the translation module bypass instructions for the flow include instructions for the switch to stop sending the packets belonging to the flow to the translation module and to apply the network address translation specified by the translation rule for the flow to the packets belonging to the flow (block 620).

The controller then sends an indication to the load balancer that the packets belonging to the flow are to bypass the translation module to cause the load balancer to disable timeout processing for the flow in the translation module (block 630).

In some embodiments, the controller may determine whether it has received an indication from the switch that the flow has terminated (decision block 640). If not, then the controller may continue to wait to receive such an indication. However, if the controller determines that it has received an indication form the switch that the flow has terminated, the controller may send, to the switch, translation module bypass removal instructions for the flow, where the translation module bypass removal instructions for the flow include instructions for the switch to stop applying the network address translation specified by the translation rule for the flow to the packets belonging to the flow (block 650). In one embodiment, the determination that the flow has terminated is based on receiving an indication from the switch that the flow has terminated. In one embodiment, the switch may have determined that the flow has terminated based on seeing a FIN flag in a packet belonging to the flow.

In one embodiment, in response to determining that the flow has terminated, the controller sends an indication to the load balancer that the flow has terminated to cause the load balancer to remove the translation rule for the flow from the translation module (block 660).

Figure 7:
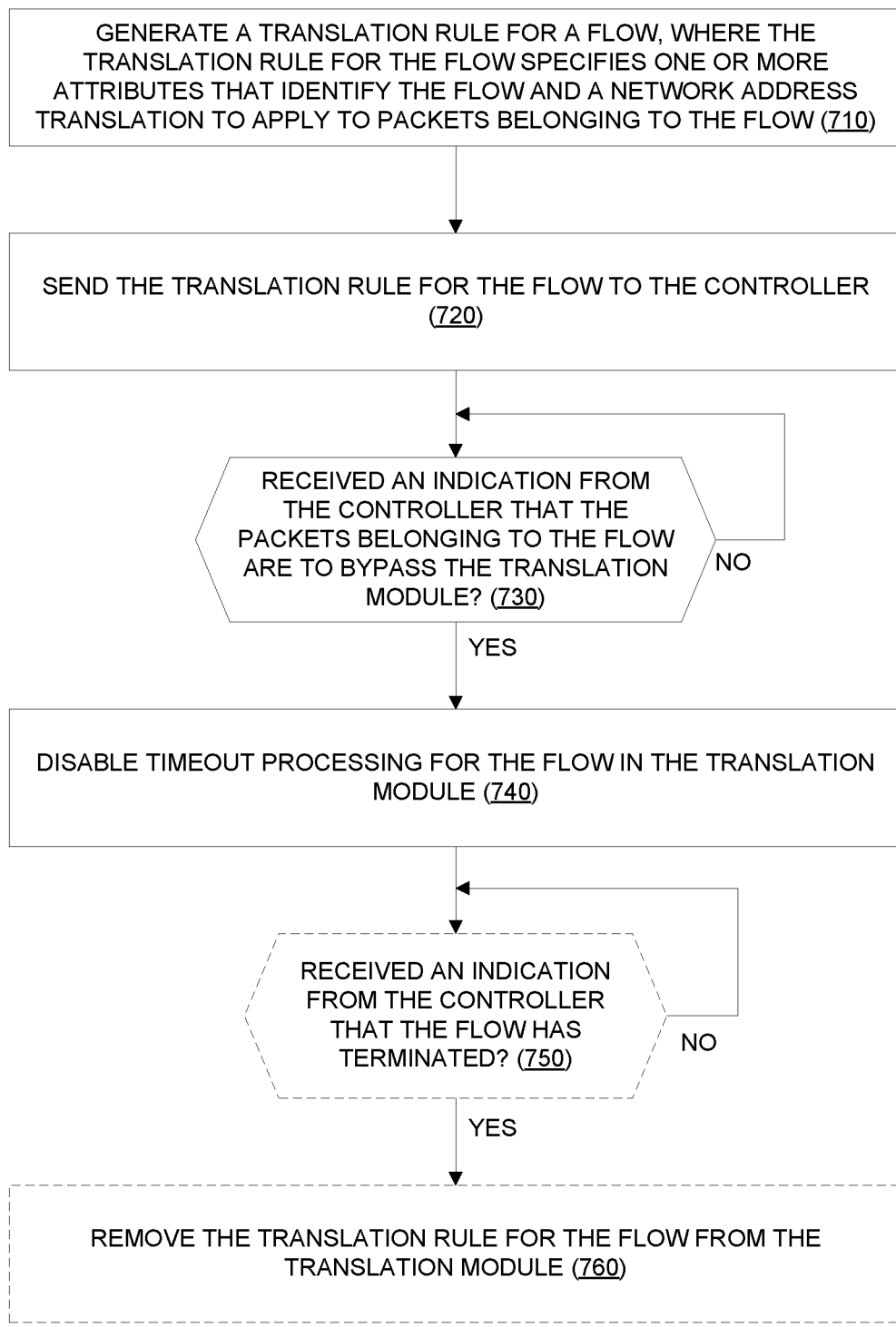
FIG. 7 is a flow diagram of a process for initiating translation module bypass for a flow, according to some embodiments.

FIG. 7 is a flow diagram of a process for initiating translation module bypass for a flow, according to some embodiments. In one embodiment, the process is performed by a load balancer 130 in a container orchestration system 100, where the load balancer 130 is communicatively coupled to a controller 110. In one embodiment, the load balancer 130 is communicatively coupled to a translation module 140 of the container orchestration system 100.

In one embodiment, the process is initiated when the load balancer generates a translation rule for a flow, where the translation rule for the flow specifies one or more attributes that identify the flow and a network address translation to apply to packets belonging to the flow (block 710). The load balancer then sends the translation rule for the flow to the controller (or otherwise makes the translation rule for the flow available to the controller) (block 720).

The load balancer may then determine whether it has received an indication from the controller that the packets belonging to the flow are to bypass the translation module (e.g., if the controller successfully configures a switch to perform translation module bypass) (decision block 730). If not, then the load balancer continues to wait to receive such indication. However, if the load balancer determines that it has received an indication from the controller that the packets belonging to the flow are to bypass the translation module, then the load balancer disables timeout processing for the flow in the translation module (block 740).

In some embodiments, the load balancer determines whether it has received an indication from the controller that the flow has terminated (decision block 750). If not, then the load balancer may continue to wait for such an indication. However, if the load balancer determines that it has received an indication from the controller that the flow has terminated, then the load balancer may remove the translation rule for the flow from the translation module (block 760).

Figure 8:
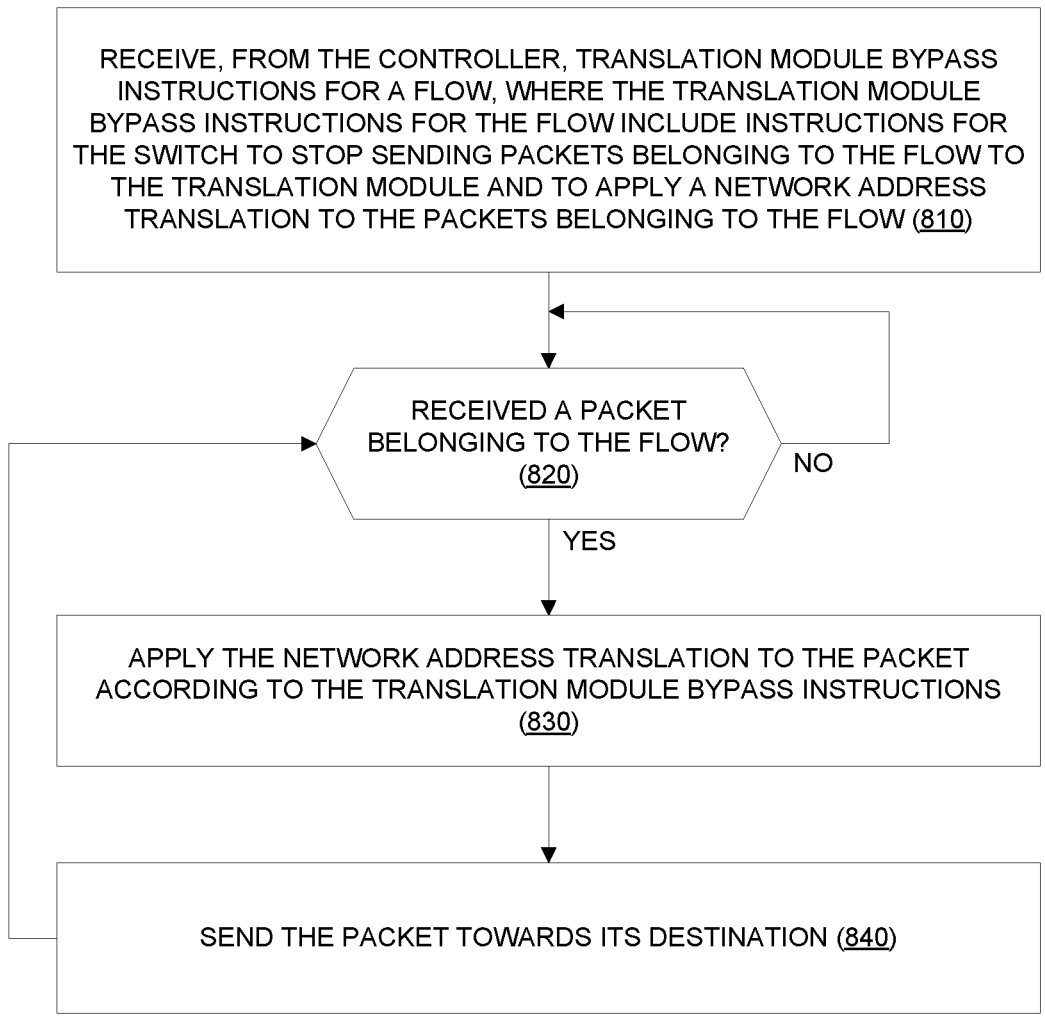
FIG. 8 is a flow diagram of a process for performing translation module bypass for a flow, according to some embodiments.

FIG. 8 is a flow diagram of a process for performing translation module bypass for a flow, according to some embodiments. In one embodiment, the process is performed by a switch 120 that is communicatively coupled to a controller 110.

In one embodiment, the process is initiated when the switch receives, from the controller, translation module bypass instructions for a flow, where the translation module bypass instructions for the flow includes instructions for the switch to stop sending packets belonging to the flow to the translation module and to apply a network address translation to packets belonging to the flow (block 810).

The switch then determines whether it has received a packet belonging to the flow (decision block 820). If not, then the switch continues to wait to receive a packet belonging to the flow. However, if the switch determines that it has received a packet belonging to the flow, then the switch applies the network address translation to the packet according to the translation module bypass instructions it received from the controller (block 830) and sends the packet towards its destination (block 840).

Figure 9A:
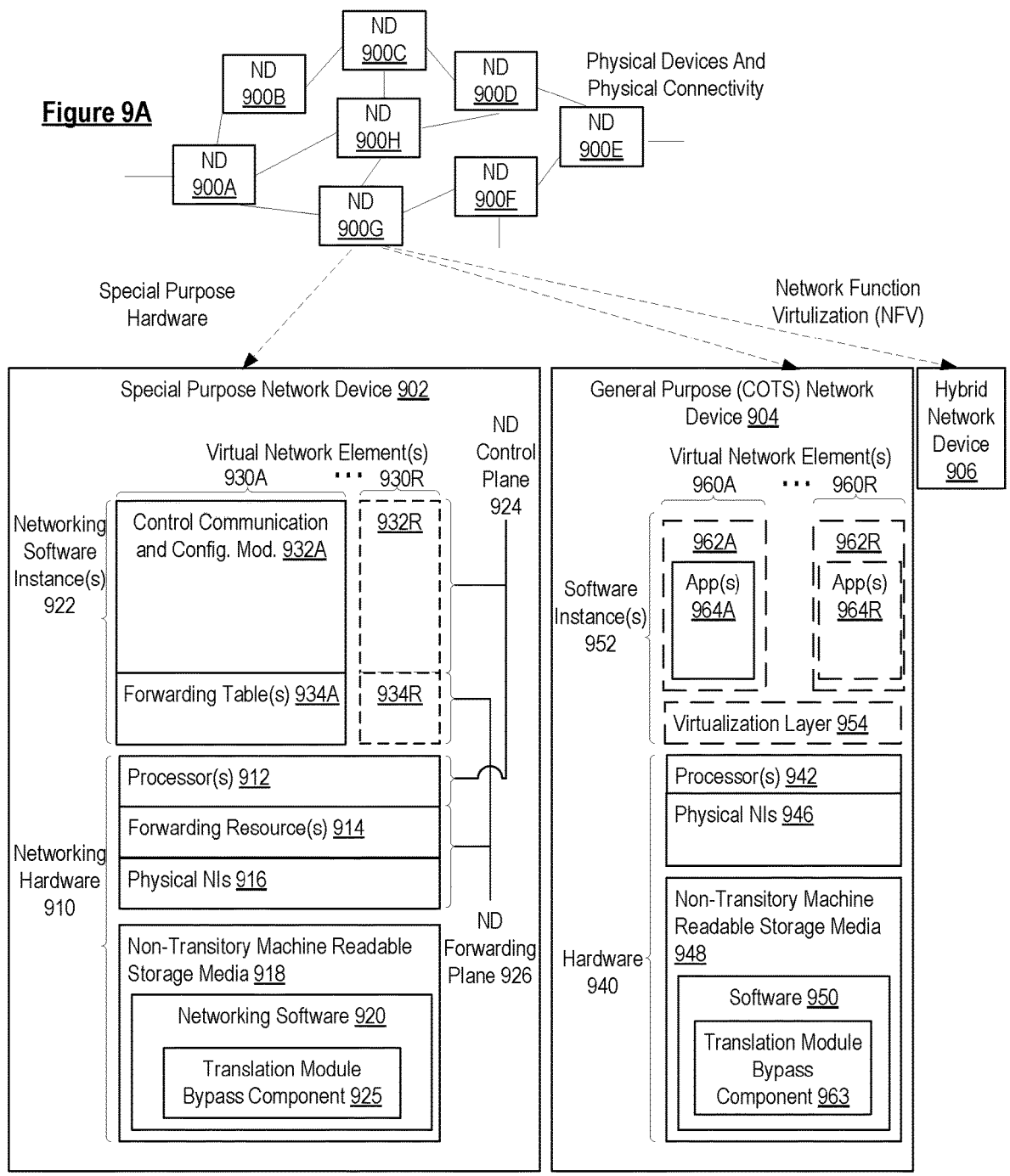
FIG. 9A illustrates connectivity between network devices (NDs) within an exemplary network, as well as three exemplary implementations of the NDs, according to some embodiments.

FIG. 9A illustrates connectivity between network devices (NDs) within an exemplary network, as well as three exemplary implementations of the NDs, according to some embodiments. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Software 920 can include code such as translation module bypass component 925, which when executed by networking hardware 910, causes the special-purpose network device 902 to perform operations of one or more embodiments described herein above as part networking software instances 922 (e.g., to perform translation module bypass as described herein).

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
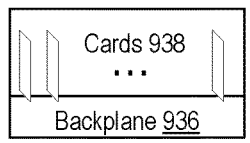
FIG. 9B illustrates an exemplary way to implement a special-purpose network device according to some embodiments.

FIG. 9B illustrates an exemplary way to implement the special-purpose network device 902 according to some embodiments. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the sett of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

Software 950 can include code such as translation module bypass component 963, which when executed by processor (s) 942, cause the general purpose network device 904 to perform operations of one or more embodiments described herein above as part software instances 962A-R (e.g., to perform translation module bypass as described herein).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
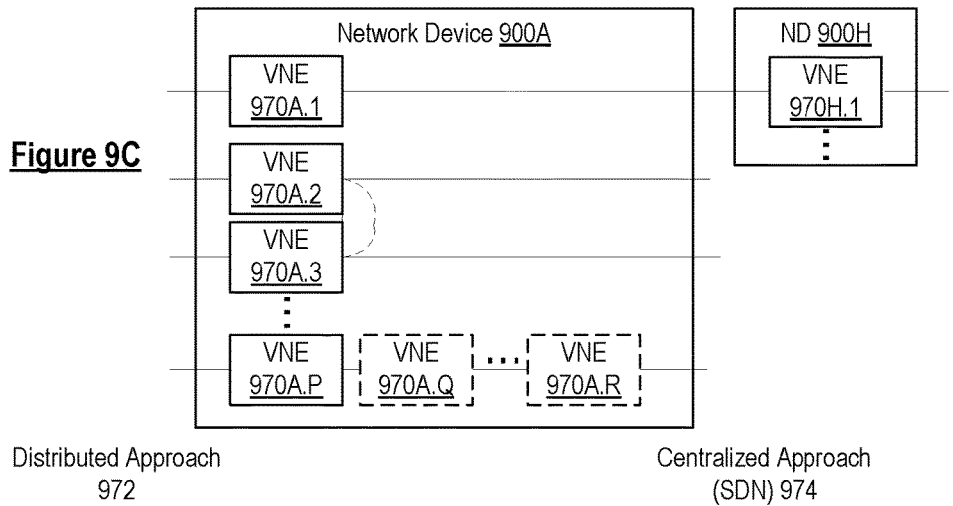
FIG. 9C illustrates various exemplary ways in which virtual network elements (VNEs) may be coupled according to some embodiments.

FIG. 9C illustrates various exemplary ways in which VNEs may be coupled according to some embodiments. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
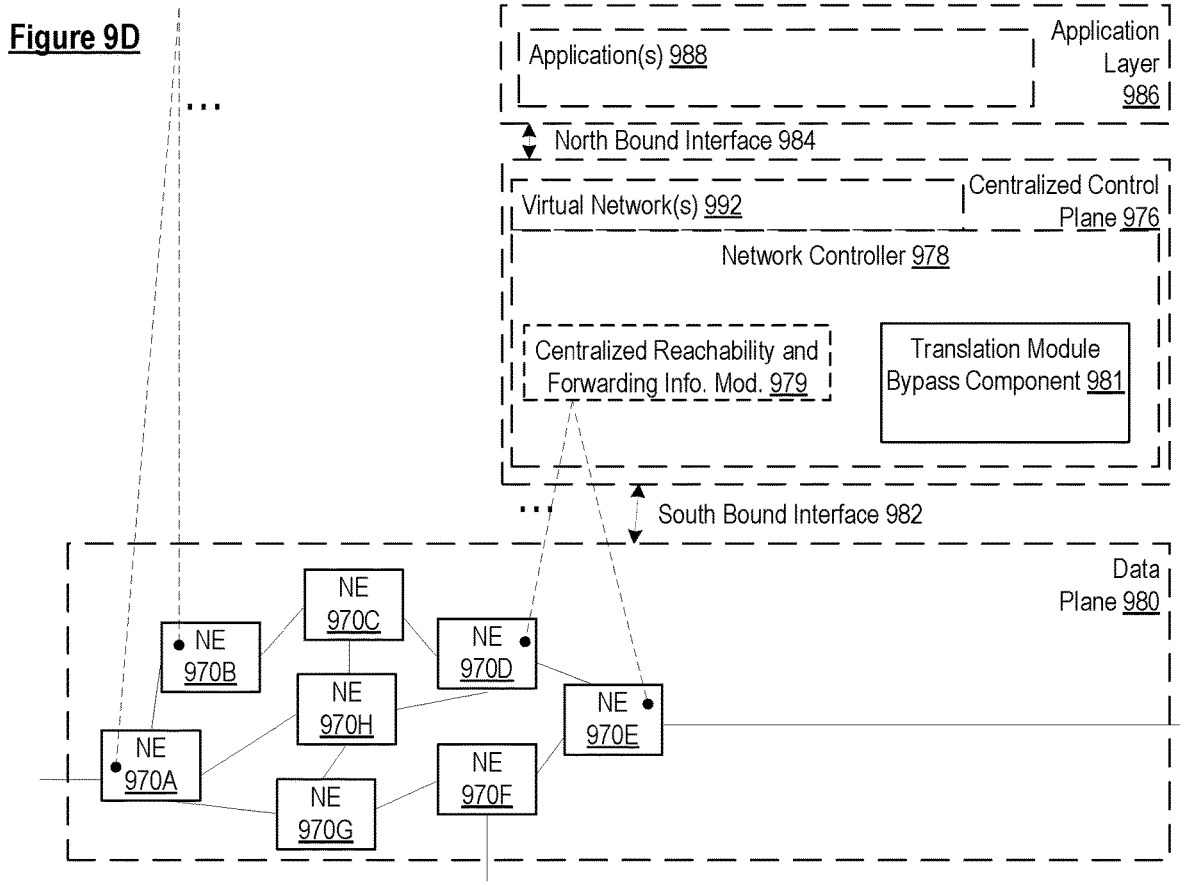
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. In one embodiment, the network controller 978 may include a translation module bypass component 981 that when executed by the network controller 978, causes the network controller 978 to perform operations of one or more embodiments described herein above (e.g., to configure a switch to perform translation module bypass as described herein)

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
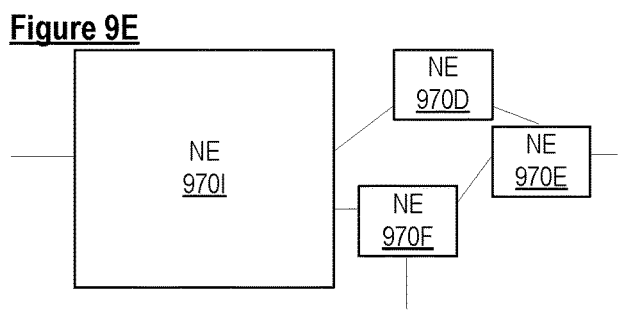
FIG. 9E illustrates the simple case of where each of the NDs implements a single NE, but a centralized control plane has abstracted multiple of the NEs in different NDs into (to represent) a single NE in one of the virtual network(s), according to some embodiments.
Figure 9F:
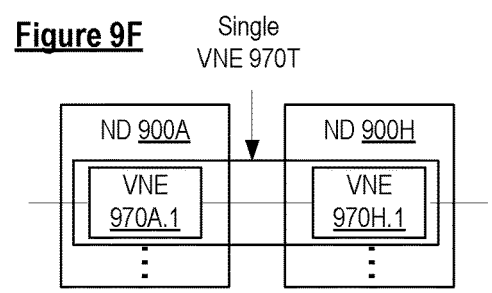
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments. Thus, the abstraction of a NE or VNE can span multiple NDs.

While some embodiments implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
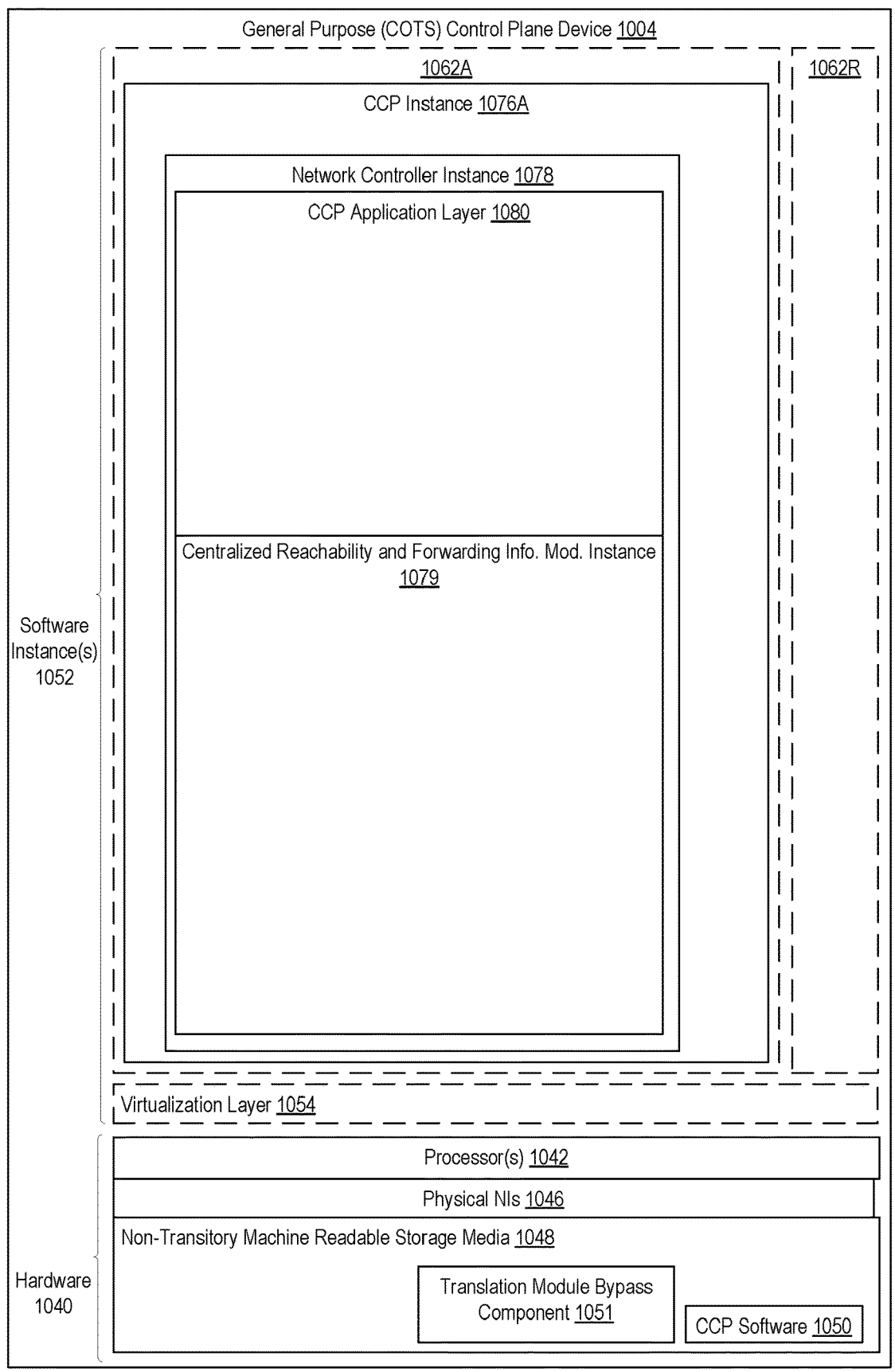
FIG. 10 illustrates a general purpose control plane device with centralized control plane (CCP) software, according to some embodiments.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050 and a translation module bypass component 1051.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The translation module bypass component 1051 can be executed by hardware 1040 to perform operations of one or more embodiments described herein above as part of software instances 1052 (e.g., to configure a switch to perform translation module bypass as described herein).

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

An embodiment may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented by one or more network devices implementing a software defined networking (SDN) controller to configure a switch communicatively coupled to the controller to perform translation module bypass in a container orchestration system, wherein the controller is communicatively coupled to a load balancer of the container orchestration system, wherein the load balancer is configured to generate translation rules for flows to be installed in a translation module of the container orchestration system that specify network address translations to be applied to packets belonging to the flows to cause the packets to be sent to or from one or more processing units of the container orchestration system, and wherein the one or more processing units form a service and each of the one or more processing units includes one or more containers, the method comprising:
- sending, to the switch, an initial packet processing instruction for the flow, wherein the initial packet processing instruction for the flow is an instruction for the switch to send packets belonging to the flow to the translation module, wherein the flow goes in a direction from a client of the service to the service;
- receiving, from the load balancer, a translation rule for a flow, wherein the translation rule for the flow specifies one or more attributes that identify the flow and a network address translation to apply to packets belonging to the flow;
- sending, to the switch, translation module bypass instructions for the flow in response to receiving the translation rule for the flow, wherein the translation module bypass instructions for the flow include instructions for the switch to stop sending packets belonging to the flow to the translation module and to apply the network address translation specified by the translation rule for the flow to packets belonging to the flow; and
- sending an indication to the load balancer that packets belonging to the flow are to bypass the translation module to cause the load balancer to disable timeout processing for the flow in the translation module.

2. The method of claim 1, wherein the container orchestration system is a Kubernetes system, the translation module is iptables, the load balancer is a kube-proxy, and the one or more processing units are one or more pods.

3. The method of claim 1, wherein the network address translation to apply to packets belonging to the flow includes a destination network address translation (DNAT) that translates a public network address of the service formed by the one or more processing units to a private network address of one of the one or more processing units.

4. The method of claim 1, wherein the one or more attributes that identify the flow includes a source network address, a source port, a destination network address, a destination port, and a protocol type.

5. The method of claim 1, further comprising:
- receiving an indication from the switch that the flow has terminated; and
- sending an indication to the load balancer that the flow has terminated in response to receiving the indication from the switch that the flow has terminated to cause the load balancer to remove the translation rule for the flow from the translation module.

6. The method of claim 5, further comprising:
- sending, to the switch, translation module bypass removal instructions for the flow in response to receiving the indication from the switch that the flow has terminated, wherein the translation module bypass removal instructions for the flow include instructions for the switch to stop applying the network address translation specified by the translation rule for the flow to packets belonging to the flow.

7. The method of claim 1, wherein the translation module, the load balancer, the switch, and the one or more processing units are implemented on the same compute node, wherein the compute node is a virtual machine or a physical network device.

8. The method of claim 1, wherein the controller and the switch communicate using a southbound communications protocol, wherein the southbound communications protocol is OpenFlow.

9. A network device configured to implement a software defined networking (SDN) controller to configure a switch communicatively coupled to the controller to perform translation module bypass in a container orchestration system, wherein the controller is to be communicatively coupled to a load balancer of the container orchestration system, wherein the load balancer is configured to generate translation rules for flows to be installed in a translation module of the container orchestration system that specify network address translations to be applied to packets belonging to the flows to cause the packets to be sent to or from one or more processing units of the container orchestration system, and wherein the one or more processing units form a service and each of the one or more processing units includes one or more containers, the network device comprising:
- a set of one or more processors; and
- a non-transitory computer-readable storage medium to store instructions, which when executed by the set of one or more processors, causes the network device to:
  - send, to the switch, an initial packet processing instruction for the flow, wherein the initial packet processing instruction for the flow is an instruction for the switch to send packets belonging to the flow to the translation module, wherein the flow goes in a direction from a client of the service to the service;
  - receive, from the load balancer, a translation rule for a flow, wherein the translation rule for the flow specifies one or more attributes that identify the flow and a network address translation to apply to packets belonging to the flow,
  - send, to the switch, translation module bypass instructions for the flow in response to receiving the translation rule for the flow, wherein the translation module bypass instructions for the flow include instructions for the switch to stop sending packets belonging to the flow to the translation module and to apply the network address translation specified by the translation rule for the flow to packets belonging to the flow, and
  - send an indication to the load balancer that packets belonging to the flow are to bypass the translation module to cause the load balancer to disable timeout processing for the flow in the translation module.

10. The network device of claim 9, wherein the container orchestration system is a Kubernetes system, the translation module is iptables, the load balancer is a kube-proxy, and the one or more processing units are one or more pods.

11. The network device of claim 9, wherein the network address translation to apply to packets belonging to the flow includes a destination network address translation (DNAT) that translates a public network address of the service formed by the one or more processing units to a private network address of one of the one or more processing units.

12. The network device of claim 9, wherein the one or more attributes that identify the flow includes a source network address, a source port, a destination network address, a destination port, and a protocol type.

13. The network device of claim 9, wherein the non-transitory computer-readable storage medium stores further instructions, which when executed by the set of one or more processors, causes the network device to:
- receive an indication from the switch that the flow has terminated and
- send an indication to the load balancer that the flow has terminated in response to receiving the indication from the switch that the flow has terminated to cause the load balancer to remove the translation rule for the flow from the translation module.

14. A non-transitory computer-readable storage medium storing instructions, which when executed by one or more processors of a network device implementing a software defined networking (SDN) controller communicatively coupled to a switch, causes the network device to perform operations for configuring the switch to perform translation module bypass in a container orchestration system, wherein the controller is to communicatively coupled to a load balancer of the container orchestration system, wherein the load balancer is configured to generate translation rules for flows to be installed in a translation module of the container orchestration system that specify network address translations to be applied to packets belonging to the flows to cause the packets to be sent to or from one or more processing units of the container orchestration system, and wherein the one or more processing units form a service and each of the one or more processing units includes one or more containers, the operations comprising:
- sending, to the switch, an initial packet processing instruction for the flow, wherein the initial packet processing instruction for the flow is an instruction for the switch to send packets belonging to the flow to the translation module, wherein the flow goes in a direction from a client of the service to the service;
- receiving, from the load balancer, a translation rule for a flow, wherein the translation rule for the flow specifies one or more attributes that identify the flow and a network address translation to apply to packets belonging to the flow;
- sending, to the switch, translation module bypass instructions for the flow in response to receiving the translation rule for the flow, wherein the translation module bypass instructions for the flow include instructions for the switch to stop sending packets belonging to the flow to the translation module and to apply the network address translation specified by the translation rule for the flow to packets belonging to the flow; and
- sending an indication to the load balancer that packets belonging to the flow are to bypass the translation module to cause the load balancer to disable timeout processing for the flow in the translation module.

15. The non-transitory computer-readable storage medium of claim 14, wherein the container orchestration system is a Kubernetes system, the translation module is iptables, the load balancer is a kube-proxy, and the one or more processing units are one or more pods.

16. The non-transitory computer-readable storage medium of claim 14, wherein the network address translation to apply to packets belonging to the flow includes a destination network address translation (DNAT) that translates a public network address of the service formed by the one or more processing units to a private network address of one of the one or more processing units.

17. The non-transitory computer-readable storage medium of claim 14, wherein the instructions, when executed by the one or more processors, causes the network device to perform further operations comprising:
- receiving an indication from the switch that the flow has terminated; and
- sending an indication to the load balancer that the flow has terminated in response to receiving the indication from the switch that the flow has terminated to cause the load balancer to remove the translation rule for the flow from the translation module.

18. The non-transitory computer-readable storage medium of claim 17, wherein the instructions, when executed by the one or more processors, causes the network device to perform further operations comprising:
- sending, to the switch, translation module bypass removal instructions for the flow in response to receiving the indication from the switch that the flow has terminated, wherein the translation module bypass removal instructions for the flow include instructions for the switch to stop applying the network address translation specified by the translation rule for the flow to packets belonging to the flow.

* * * * *